INVENTORS:
George Josef Ullrich
Theo Mager

By Alan C. Rose
Attorney

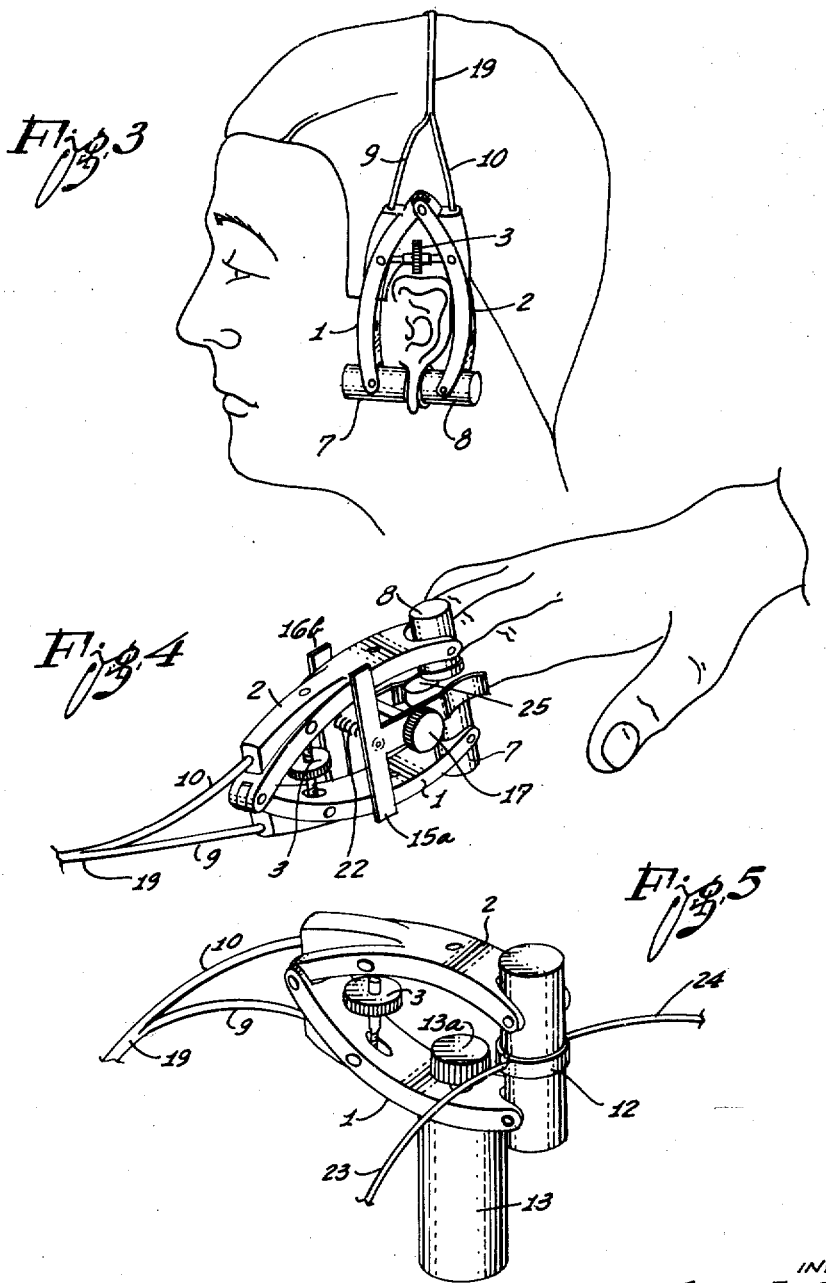

3,152,587
MEDICAL PHOTOMETRIC APPARATUS
Georg Josef Ullrich, Freiburg im Breisgau, and Theo Mager, Donaueschingen, Germany, assignors to Fritz Hellige & Co., G.m.b.H., Freiburg, Germany
Filed Mar. 24, 1961, Ser. No. 98,091
Claims priority, application Germany Mar. 31, 1960
5 Claims. (Cl. 128—2)

The present invention relates to photometric apparatus for medical purposes, and more particularly to a versatile apparatus for determining the oxygen saturation of the blood, by measurements of blood color either through the skin or through the use of a blood sample.

In general, photometric receptors work on the principal of detecting changes in light absorption which accompany changes in color, such as the shift from the bright red color of freshly-oxidized arterial blood to the bluer color of reduced veinous blood. The system of oxymetry practiced most widely at this time is based on the fact that oxydized and reduced blood have approximately the same absorption in a certain area of the spectrum, for instance in the visible red area of the spectrum, wherein light has a wavelength ranging from 600 to 700 millimicrons; whereas the absorption of oxydized blood (including oxyhemoglobin) in another area of the light spectrum, for instance within the infrared spectral area (where the wavelength of light is from 700 to 1000 millimicrons), is much higher than the absorption of unoxydized or reduced blood. For the determination of oxygen saturation, the ear lobe, the tip of a finger or a blood sample of the patient is placed between a light source which has enough intensity within the two chosen critical spectral areas and two photo elements. The photo elements each respond through different filters to one of the two spectral areas and create a photo current in correspondence with the amount of light passing through.

The light absorption has an exponential dependence on the concentration or the layer thickness of the substance to be tested. It is therefore desirable to use photo cells with logarithmic sensitivity in connection with high resistance circuitry or proportioning, or to use logarithmic amplifiers to produce a significant output signal. In addition, differential circuits for the two signals derived from the two spectral areas may be employed to subtractively combine the two signals. By this technique, the background components may be eliminated and output signals may be produced which represent only the desired component which depends on the concentration of oxyhemoglobins, thus indicating the oxygen saturation of the blood.

The basic scientific concepts and the several modes of realization of such measurements are basically known and developed to a high degree. They are not the subject of the present invention. Detailed information on this subject is to be found for instance in the publication of G. A. Millikan in the "Review of Scientific Instruments," vol. 13, 1942, pp. 434–443; in the publication of E. A. G. Goldie in "The Journal of Scientific Instruments," vol. 19, 1942, pp. 23–25, and in the publication of F. D. Stott in "The Journal of Scientific Instruments," vol. 30, 1953, pp. 120–123, as well as in the U.S. Patents 2,414,747 to Kirschbaum, 2,358,992 to Millikan, and 2,439,857 to Millikan.

In the photometric measurement of oxygen saturation, light is sometimes transmitted through an ear lobe or a finger, or a blood sample is taken from the body and light is transmitted through this sample, either on a static or a continuous basis, as noted above. However, up to the present time, no single apparatus has been available which is readily adjustable for each of these different measurement techniques.

Accordingly, a principal object of the invention is to increase the versatility of photometric medical apparatus.

The desired apparatus should make possible the measuring of oxygen saturation under variety of situations and with a variety of samples, for instance, on an ear lobe, on a finger or a toe of a person, or with the aid of a transparent cuvette with a fixed blood sample or with blood flowing through it, or with another sample liquid. The apparatus of the invention should accommodate in a very simple way all of these different situations of use.

In accordance with the present invention, the foregoing desiderata are achieved through a versatile clasp arrangement. The clasp has two arms which may be adjustably positioned with respect to each other. The light source is adjustably mounted on one arm, and the photodetector and any required filters are adjustably mounted on the other arm so that the optical system may be aligned as the spacing between the arms is varied. The apparatus will therefore accommodate thin objects such as an ear lobe, or a thin cuvette, as well as thicker members to be tested, such as a finger or a toe. The clasp is preferably bowed so that it will readily fit around a human ear, when the ear lobe is held between the light source unit and the photodetector. The electrical wires passing over the top of the subject's head help hold the unit in place.

An attachment including a pair of T-shaped spring members may also be employed in combination with the clasp as described above to hold a finger or toe in place when it is being photoanalyzed. More specifically, the two T-shaped members form a supplemental clamp which engages the opposite sides of the clasp and has opposed spring members which hold the digit (finger or toe) between the light source and the photodetector.

The photometric apparatus, according to the invention, is also suitable for use as a detector for diagnosis of the dynamics of circulation through use of blood dyes. In this type of measuring technique, the time elapsed or the time needed for concentration of a blood dye at a particular point in the circulatory system may be monitored. One can also measure the speed of flow of the blood and the capacity of the human heart. In addition, the apparatus may be used for technical and scientific, especially chemical analytical measurements, if the measurements involve changes which produce corresponding changes in the property of light absorption in particular spectral ranges.

Other objects, features and advantages of the invention will become apparent from a consideration of the following detailed description and from the accompanying drawing, in which:

FIG. 3 illustrates the use of the apparatus of FIG. 1 on an ear;

FIG. 4 shows its use on a finger; and

FIG. 5 shows the device of FIG. 1 used in connection with a cuvette permitting flow of the sample liquid.

Figure 1:
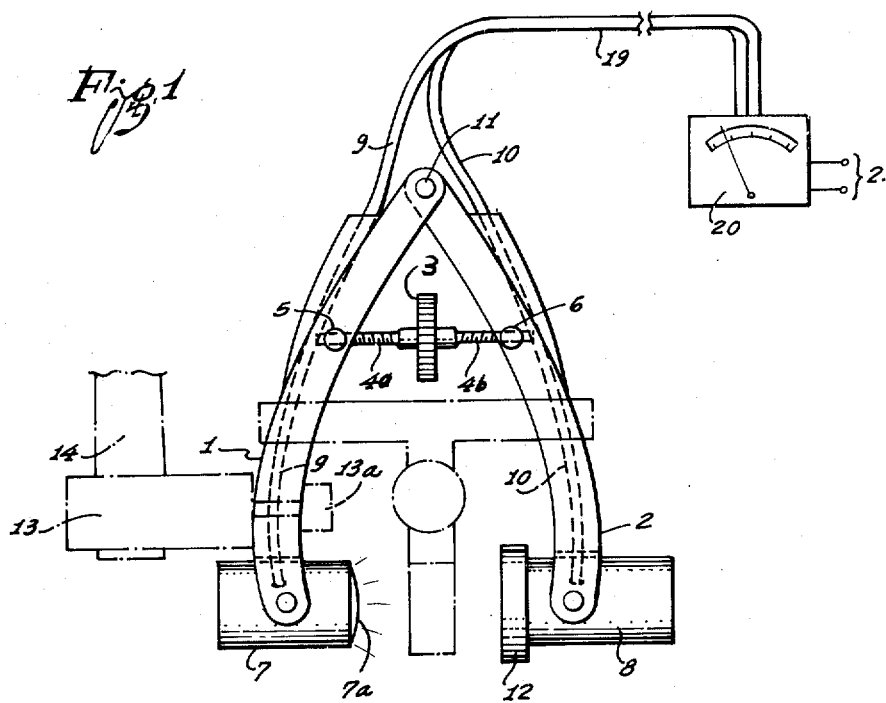
FIG. 1 shows an embodiment of the invention in a frontal view.

With reference to FIG. 1 of the drawings, the photometric receptor of the invention is characterized by a plier-like clamp or clasp, adjustable in its width and including two arms 1 and 2 movable with respect to each other, and pivotally connected at point 11. The arms are preferably made of plastic material. One arm carries on its free end an enclosure 7 containing a light source 7a pointing toward the other arm, and the other arm carries on its free end a photo element and an enclosure 8 which carries the necessary light filters and faces in the direction of the other arm. The element 12 is a removable fastener for use with cuvettes as disclosed below in connection with the description of FIG. 5.

The clasp of FIG. 1 is preferably made from translucent material and shall have such dimensions that sample bodies of different size can be arranged or placed between the light source enclosure and the photo element enclosure. Thus, for example, in the case of oxymetry, it may accommodate an ear lobe in accordance with FIG. 3, or a finger tip 25 as shown in FIG. 4, or a cuvette, especially a flow cuvette, in accordance with FIG. 5, for blood tests. Of course the enclosure 8 can include either conventional photocells, phototransistors or other known photosensitive devices, and fulfill practically the same function. The two enclosures, 7 and 8, are movable to approximately the same degree in the plane of the two arms of the clasp that these arms are movable with respect to each other so that the enclosures can stay in alignment independent of the thickness of the sample body.

To realize the desired versatility of application discussed above, the two arms of the clasp, which may be slightly concave to each other, shall have for instance, a length between 7 and 15 centimeters, preferably approximately 10 centimeters. In the plane defined by the two arms they may have a thickness of 0.4 to 1 centimeter preferably approximately 0.6 centimeters at the outer ends and a thickness of 1 to 2 centimeters, preferably approximately 1.5 centimeters on the joined ends, with a steady transition of thickness from one end to the other. Because of the light material used for the two arms they can have at the outer end perpendicular to the plane of the arms a height of approximately 1.5 to 2 centimeters, without being unduly heavy. This width is enough to conveniently permit the mounting of the clawlike configuration of the end of the arms to hold the enclosures for the light source or the photo elements, respectively, so that they are movable within certain limits. However, the height of the arms in the direction toward the joint 11 can become smaller so that at the pivoted end the height is approximately 0.5 to 1.5 centimeters, preferably about 1 centimeter. Therefore, the size of the clasp configuration is such that, as shown in FIG. 3, the normal human ear can easily be placed into the area defined by the two arms 1 and 2, the two enclosures 7 and 8, and the adjustment screw 3, and the ear lobe can be firmly clasped between the two enclosures 7 and 8. The connection cable 19 will be placed over the head so that it will not interfere with the handling of the instrument and will help in holding it in place on the ear.

The clasplike arrangement allows adjustment within wide limitations whereby one can dispense with cumbersome arrangements otherwise used for a steady alignment of the two enclosures 7 and 8. A beam direction of the light source 7a normal to the plane of the photocells of the enclosure 8 may be maintained, in accordance with the invention by adjusting the enclosures 7 and 8 to the same degree as the arms are movable and in the same plane which is defined by the two arms.

The indicated dimensions will then also allow, according to another feature of the invention, placement of the current carrying leads 9 and 10 for the light source enclosure 7 and for the photo element enclosure 8, completely within the arms 1 and 2. Therefore, these power leads cannot interfere with the handling of the equipment. Both leads are combined, after leaving the pivoted ends of the arms, into a common cable 19 which is connected to the measuring equipment 20 and the power input terminals 21, shown schematically in FIG. 1.

The inner configurations of the light source enclosure 7 and the photo element enclosure 8 correspond to the usual arrangements used for photometric measuring equipment. For instance, the photo element enclosure normally contains two parallel chambers with a different light filter in each for the desired spectral areas, and a photo element in each with a special sensitivity for the appropriate spectral area.

To enable the multipurpose use of the photometric receptor in accordance with the invention, the threaded spindle 4a, 4b, placed between the two arms 1 and 2 close to the joint 11, is used for adjustment of the clasp width. The threaded spindle is mounted in the pivoted threaded nuts 5 and 6 in arms 1 and 2. Knurled nut 3 is secured to spindle 4 to provide manual adjustment.

Figure 2:
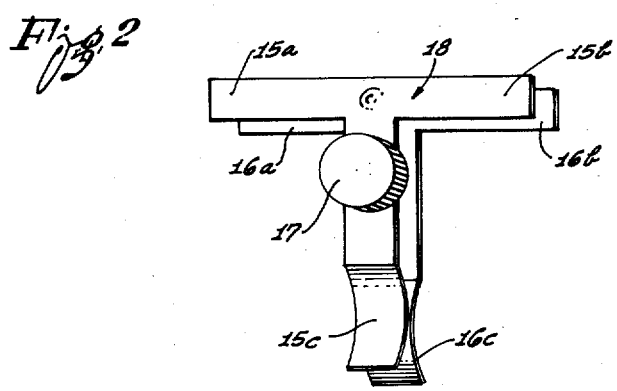
FIG. 2 shows an additional clamping member which may be employed as an adjunct to the device of FIG. 1.

For attaching the photometric receptors to a finger, an additional finger clasp 18 is used in accordance with FIGS. 2 and 4. The relative position of the T-shaped member 18 is shown in FIG. 1 by broken lines. This clasp can consist of two T-shaped sheet metal pieces 15 and 16, of leaf spring material and held spaced from each other by a spring support. The two upper ends 15a and 15b or, respectively, 16a and 16b, of the T-shaped member, rest on the two clasp arms, and the extensions 15c, and 16c form a finger clasp which can hold a fingertip to be photo-analyzed in the proper position between the light source enclosure 7 and the photo-element enclosure 8. The distance between the two portions 15c and 16c of the finger clasp are adjustable through an adjusting screw 17. The flanges 15a–15b and 16a–16b are in addition pressed apart through pressure spring 22 so that, through the help of the adjustment screw 17 and the resulting leverage, the clasp is securely seated on the two arms 1 and 2 as well as on the finger 25. In use, the clamp 18 may advantageously be fastened to the arms at a suitable distance from the joint 11.

Finally, referring to FIG. 5, in order to perform measurements on blood samples in cuvettes or flow cuvettes, the photoelement enclosure 8 may include a removable fastening device 12 for receiving small cuvettes which may be placed in it for laboratory checks. In FIG. 5 the tubes 23 and 24 are the inlet and outlet tubes, respectively, of a flow cuvette held within the fastening device 12. It is also advisable to provide for an additional support 13 which is connected to one arm through a knurled screw 13a to permit in accordance with the invention, the connection of the photometric receptor to the arm 14 of stand or tripod. FIG. 1 shows this support 13 and the arm of the stand 14 by dashed lines, and clearly indicates how the apparatus may be mounted on the stand.

It is to be understood that the above-described arrangements are illustrative of the application of the principles of the invention. Numerous other arrangements may be devised by those skilled in the art without departing from the spirit and scope of the invention. Thus, by way of example and not of limitation, the apparatus may be made through the use of mechanical components which perform the same functions as the corresponding elements shown in the drawing. Accordingly, it is to be understood that the present invention is only to be limited by the spirit and scope of the appended claims.

What is claimed is:

1. A medical photometric apparatus comprising a plier-like clasp assembly including first and second pivoted arms; means including threaded nuts secured in said arms near the pivot point of said arms and a rotatable shaft mounted in said nuts for selectively adjusting the spacing between said arms and holding them in the adjusted position; a light source and a photodetector pivotally mounted respectively on the free ends of said first and second arms; the pivot axes of said first and second arms, said light source, and said detector being generally parallel; electrical connections for said light source and said detector extending through said arms and being joined to form an external cable beyond the pivot point of said arms; and a knurled nut fixedly mounted on said threaded shaft; said arms being convex in form and relatively narrow toward the pivot point to form, with said knurled nut, an opening which may enclose a human ear when the light source and detector are firmly clasped onto opposite sides of the ear lobe, said cable being conveniently arranged to extend over the head of the patient and thus to assist in holding the apparatus flat against the side of the head.

2. A medical photometric apparatus comprising a plier-like clasp assembly including first and second pivoted arms, means for selectively adjusting the spacing between said arms and for holding them in the adjusted position, a light source and a photodetector pivotally mounted respectively on the free ends of said first and second arms, the pivot axes of said first and second arms, said light source, and said detector being generally parallel, and electrical connections for said light source and said detector extending through said plastic arms and being joined to form an external cable beyond the pivot point of said arms, said arms being convex in form and relatively narrow toward the pivot point to form an opening which may enclose a human ear when the light source and detector are firmly clasped onto opposite sides of the ear lobe, said cable being conveniently arranged to extend over the head of the patient and thus to assist in holding the apparatus in place.

3. In a medical photometric apparatus comprising first and second arms; means for varying the spacing between said arms; a light source and a photodetector adjustably mounted on said first and second arms, respectively, to face each other as the spacing between said arms is varied; a supplemental clamp engaging said arms for holding a digit between said light source and said photodetector, said clamp including two flat T-shaped spring members, and means for drawing said members together so that the ends of the upper portions of said T-shaped members engage said arms, and the main leg portions of said members engage the digit.

4. A medical photometric apparatus comprising a plier-like clasp assembly including first and second pivoted arms; means including threaded nuts secured in said arms near the pivot point of said arms and a rotatable shaft mounted in said nuts, a knurled nut fixedly mounted on said threaded shaft, for selectively adjusting the spacing between said arms, a light source and a photodetector pivotally mounted respectively on the free ends of said first and second arms, the pivot axes of said first and second arms, said light source, and said detector being generally parallel, and electrical connections for said light source and said detector extending through said arms and being joined to form an external cable beyond the pivot point of said arms.

5. A medical photometric apparatus comprising a plier-like clasp assembly including first and second pivoted arms; means including threaded nuts secured in said arms near the pivot point of said arms and a rotatable shaft mounted in said nuts, a nut fixedly mounted on said threaded shaft, for selectively adjusting the spacing between said arms, a light source and a photodetector pivotally mounted respectively on the free ends of said first and second arms, the pivot axes of said first and second arms, said light source, and said detector being generally parallel, and electrical connections for said light source and said detector being joined to form an external cable beyond the pivot point of said arms.

References Cited in the file of this patent

UNITED STATES PATENTS

| | | |
|---|---|---|
| 261,066 | Thompson et al. | July 11, 1882 |
| 2,790,438 | Taplin et al. | Apr. 30, 1957 |

FOREIGN PATENTS

| | | |
|---|---|---|
| 815,244 | France | Apr. 5, 1937 |
| 515,310 | Great Britain | Dec. 1, 1939 |
| 745,646 | Great Britain | Feb. 29, 1956 |